United States Patent [19]

Long

[11] Patent Number: 5,776,546
[45] Date of Patent: Jul. 7, 1998

[54] METHOD AND APPARATUS FOR IMPREGNATING A POROUS SUBSTRATE WITH A SOLIDS-BEARING SATURANT

[75] Inventor: Eliot R. Long, Wheeling, Ill.

[73] Assignee: Miply Equipment, Inc., Brooklyn, N.Y.

[21] Appl. No.: 673,240

[22] Filed: Jun. 26, 1996

[51] Int. Cl.[6] ........................................................ B05D 1/36
[52] U.S. Cl. .................. 427/402; 427/434.2; 427/434.3; 427/434.4
[58] Field of Search ........................ 427/434.2, 434.3, 427/434.4, 402, 356

[56] References Cited

U.S. PATENT DOCUMENTS

| | | | |
|---|---|---|---|
| 2,132,863 | 10/1938 | Schur | 427/434.2 |
| 2,554,254 | 5/1951 | Kroft . | |
| 3,516,851 | 6/1970 | Kaila . | |
| 3,632,409 | 1/1972 | Barnett, Jr. | 118/50 |
| 3,671,298 | 6/1972 | Maynard . | |
| 4,112,151 | 9/1978 | Cooke | 427/322 |
| 4,158,076 | 6/1979 | Wallstèn | 427/294 |
| 4,588,616 | 5/1986 | Menser | 427/430.1 |
| 4,590,099 | 5/1986 | Reith | 427/296 |
| 4,702,943 | 10/1987 | Long | 427/282 |
| 4,737,383 | 4/1988 | Matsumae et al. | 427/294 |
| 4,767,643 | 8/1988 | Westervelt et al. | 427/294 |
| 4,772,493 | 9/1988 | Syrop et al. | 427/370 |
| 4,773,941 | 9/1988 | Iijima et al. | 134/33 |
| 4,915,989 | 4/1990 | Menser et al. | 427/434.2 |
| 4,982,686 | 1/1991 | Long | 118/406 |
| 5,104,698 | 4/1992 | Hayashi et al. | 427/434.2 |
| 5,468,706 | 11/1995 | Rauleder et al. | 502/151 |

*Primary Examiner*—Katherine A. Bareford
*Attorney, Agent, or Firm*—Brinks Hofer Gilson & Lione

[57] ABSTRACT

A method and apparatus for impregnating a porous substrate with a solids-bearing saturant first introduces the saturant into the substrate from a first side, and then introduces a displacement material into the substrate from the first side. This displacement material forces at least some of the saturant in the substrate farther into the substrate, away from the first side. A wide variety of devices can be used for introducing the saturant and the displacement material into the substrate, including pressure saturators, converging chamber pressure saturators, roller coaters, blade coaters, and the like. By pushing the saturant away from the first side with the displacement material, the first side can be made more suitable for further processing such as adhesive bonding.

27 Claims, 5 Drawing Sheets

METHOD AND APPARATUS FOR IMPREGNATING A POROUS SUBSTRATE WITH A SOLIDS-BEARING SATURANT

BACKGROUND OF THE INVENTION

This invention relates to systems for introducing a saturant into a porous substrate such as a paper web.

When a solids-bearing saturant is impregnated into a porous substrate, a portion of the solids may remain on the surface of the substrate, and an additional portion may accumulate close to the surface. In this way, an unwanted concentration of solids at the surface may be created, and the pores of the substrate may be substantially closed. Saturant solids at and near the surface frequently impede further processing of the impregnated substrate. Additionally, the surface solids and any excessive concentration of solids near the surface may not serve the purposes of the impregnation, and may therefore represent an unwanted expense.

As an example, in the manufacture of corrugated containers, impregnated liner board and/or corrugating medium may be used to improve compressive strength, promote fire retardance, promote electrical conductivity, and so forth. Saturant solids at or near the surface, however, may interfere with bonding the liner to the medium when manufacturing corrugated board. An excessive concentration of solids near the surface may also cause score-line cracking. These problems may reduce the value of the impregnation treatment.

One approach that has been suggested for reducing or eliminating these problems is to substantially dilute the solids content of the solids-bearing saturant. This would be expected to reduce the solids level on the surface and to distribute the solids within the substrate. Dilution of the saturant bears the considerable cost of increasing the drying requirement: either the investment in drying equipment is increased or the production speed of the treatment process is decreased, and, in any event, the energy requirement per unit of material treated is increased. Further, migration of saturant solids during drying is a commonly observed phenomenon. Dilution may actually increase the movement of solids to the surface during drying.

Another approach that has been suggested is to remove undesired saturant solids at and near the surface. Current methods, such as using a blade doctor knife, water knife, or metering rod to wipe solids off of the surface all have limitations. Among the problems created by such methods are picking fibres from the surface, roughening or otherwise disrupting the surface, creating an expensive re-circulation and filtration requirement for water and solids removed, possibly contaminating the work area air and other equipment, and wasting the solids removed.

SUMMARY OF THE INVENTION

The present invention is directed to an improved approach in which a solids-bearing saturant is pushed farther into the substrate with a displacement material.

According to a first aspect of this invention, a method is provided for impregnating a porous substrate with a solids-bearing saturant comprising with steps of introducing the saturant into the substrate from a first side, and then pushing the saturant farther into the porous surface with a displacement material.

According to another aspect of this invention, an apparatus is provided for impregnating a porous substrate with a solids-bearing saturant. This apparatus comprises a first applicator containing the saturant and configured to introduce the saturant into the substrate from a first side, and a second applicator containing a displacement material and configured to introduce the displacement material into the first side of the substrate to push the saturant farther into the substrate, away from the first side.

The method and apparatus of this invention can be used to obtain more nearly optimum distributions of the solids of the saturant within the substrate. For example, if the solids of the saturant interfere with adhesion, the displacement material can be designed to push the saturant away from the first side, and to leave a substantial fraction of the interstitial pores of the first side open, ready to accept an adhesive.

DETAILED DESCRIPTION OF THE PRESENTLY PREFERRED EMBODIMENTS

Figure 1:
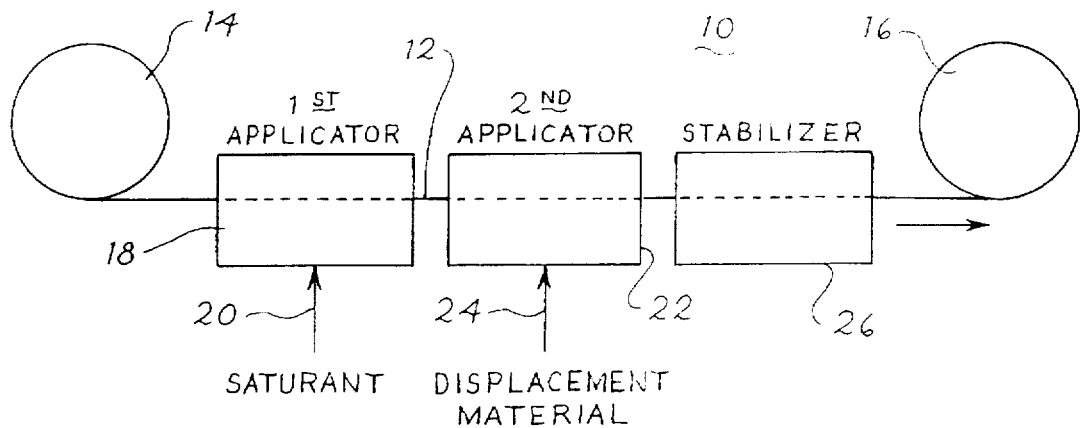
FIG. 1 is a block diagram of a saturant application system that incorporates a presently preferred embodiment of this invention.

Turning now to the drawings, FIG. 1 shows an overall view of a saturating system 10 which incorporates the preferred embodiment of this invention. The saturating system 10 includes a porous substrate 12, which can be of any suitable width, and which can, for example, be a continuous paper web.

The system 10 includes a conventional unwind station 14 and a conventional rewind station 16. The substrate 12 is moved in a continuous fashion from the unwind station 14 to the rewind station 16, passing through a first applicator 18, a second applicator 22 and a dryer 26.

The first applicator 18 includes an inlet 20 at which a solids-bearing saturant is introduced into the applicator 18. The first applicator 18 can take many forms, as described below. Basically, the first applicator 18 applies the saturant to at least a first side of the substrate 12. As explained below, many alternative solids-bearing saturants are contemplated, as appropriate for the application. As used herein, the term "solids-bearing saturant" is intended broadly to cover any material which leaves a residue when introduced into the web and stabilized. The term is intended to cover solutions, mixtures and suspensions, as well as any other suitable combinations of a carrier and an additive. The term covers both low-viscosity fluids such as aqueous solutions, and high viscosity materials such as asphalt.

After the substrate 12 has passed through the first applicator 18, it is then introduced into the second applicator 22. The second applicator 22 includes an inlet 24 at which a displacement material is introduced into the second applicator 22. The applicator 22 operates to force the displacement material into the substrate 12 from at least the first side so as to push at least a portion of the solids-bearing saturant into the substrate, away from the first side. In this way, the amount of solids from the solids-bearing saturant at the first side is reduced by the displacement material. The second applicator 22 can take many forms, as described below. In cases where a high solids content saturant has been used, it may be important to apply the displacement material before the viscosity of the saturant in the web increases substantially. Preferably, the substrate 12 proceeds directly from the first applicator 18 to the second applicator 22 without any substantial drying therebetween. As used herein "substantial drying" means sufficient drying such that the saturant is impeded from moving farther into the substrate, or the carrier of the saturant is removed sufficiently to allow the displacement material to be impregnated into the substrate without displacing the solids of the saturant.

The displacement material can also take many forms. In one example, the displacement material can be pure water, without any additives. Alternately, the displacement material can be a combination of a carrier liquid and the same additive as the saturant, but at a lower concentration. Alternately, the displacement material can include a carrier liquid and another additive intended to be located nearer the first surface than the additive of the saturant. This other additive can have a concentration which is lower than, comparable to, or greater than that of the saturant. As used herein, the term "displacement material" is intended broadly to encompass gas, liquid, foam, and other flowable materials, including high-viscosity materials such as tar, asphalt, or wax, with or without additives.

After the displacement material has been introduced into the substrate 12 in the second applicator 22, the substrate is passed through a stabilizer such as a dryer 26 which can take any suitable form. In the dryer 26 the liquid portions of the saturant and the displacement material are removed from the substrate 12. The dried substrate 12 is then wound into a roll at the rewind station 16. Alternate embodiments can include a cooling device or a heating device as the stabilizer, depending on the saturant and displacement material used.

Figure 2:
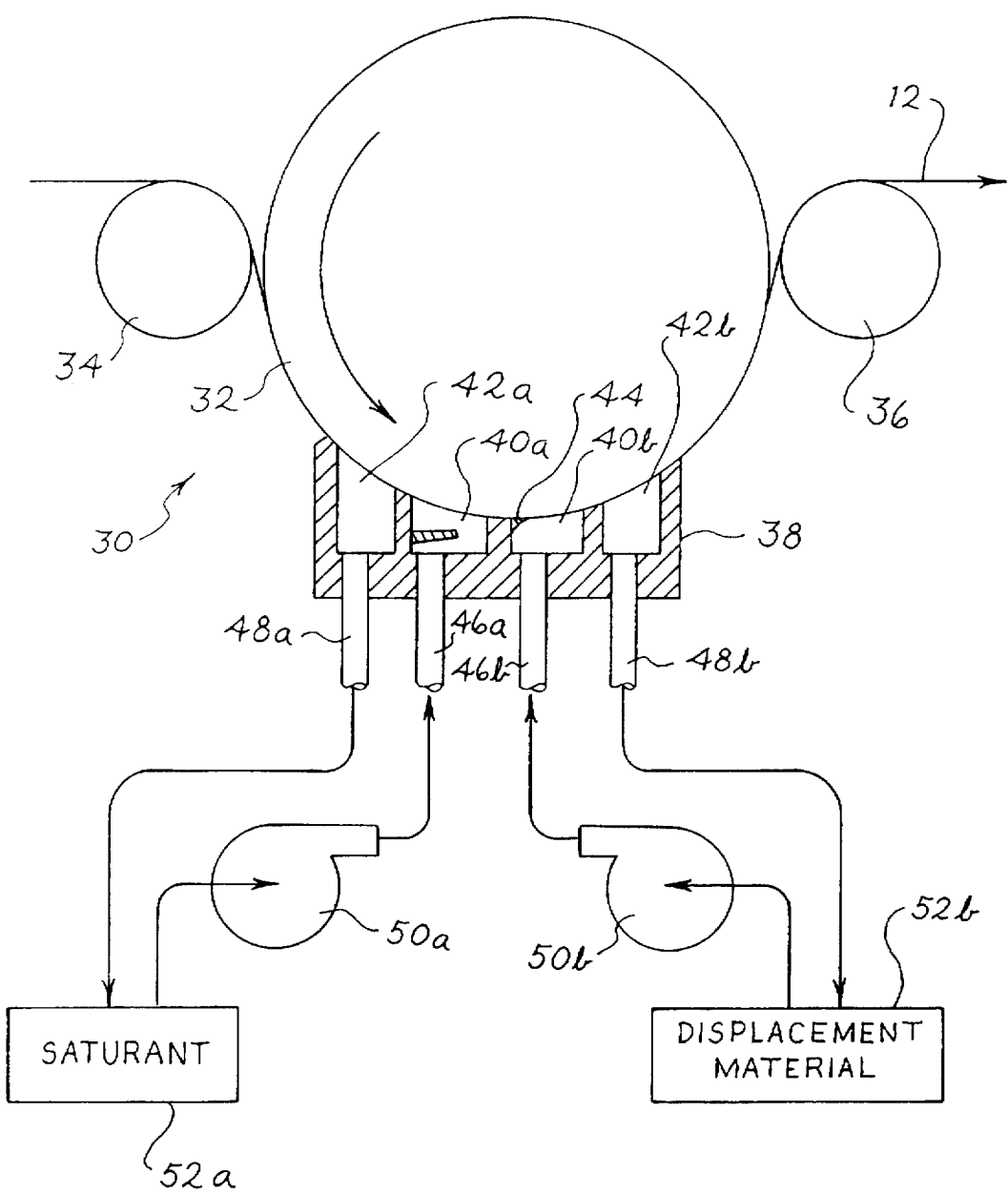
FIG. 2 is a cross-sectional view of a pressure saturator suitable for use in the system of FIG. 1.

FIG. 2 shows a cross-sectional view of a pressure saturator 30 that can be used in the system 10 for both the first and second applicators 18, 22. As shown in FIG. 2, the pressure saturator 30 includes a cylindrical mandrel 32 and feed rolls 34, 36. The mandrel 32 and the rolls 34, 36 are driven in rotation to move the substrate 12 through the saturator 30. A chamber-defining element 38 is mounted closely adjacent to the mandrel 32. This element 38 defines two saturation chambers 40a, 40b and two seal chambers 42a, 42b. A flexible seal 44 can be positioned between the saturating chambers 40a, 40b to bear lightly against the substrate 12.

Inlets 46a, 46b connect the respective saturating chambers 40a, 40b to respective pumps 50a, 50b. The pumps 50a, 50b are in turn supplied by respective reservoirs 52a, 52b. The reservoir 52a can be filled with a solids-bearing saturant as described above, and the reservoir 52b can be filled with a displacement material as described above. Outlets 48a, 48b connect the seal chambers 42a, 42b to the reservoirs 52a, 52b, respectively, to recycle the respective fluids.

In use, the mandrel 32 and the rolls 34, 36 are rotated to pass the substrate 12 from left to right in the view of FIG. 2 across the chambers 42a, 40a, 40b, 42b. The pumps, 50a, 50b supply saturant and displacement material, respectively, under pressure to the saturating chambers 40a, 40b. Leakage from the saturating chambers 40a, 40b is collected in the seal chambers 42a, 42b and recycled to the respective reservoir 52a, 52b. The flexible seal 44 reduces leakage from the saturating chamber 40a to the saturating chamber 40b.

By properly adjusting the speed of the mandrel 32 and the pressures developed by the pumps 50a, 50b, a desired level of solids-bearing saturant can be impregnated into the substrate 12 via a first side as the substrate 12 passes through the saturating chamber 40a. Then a desired amount of the displacement material can be forced into the substrate via the first side as the substrate 12 passes through the saturating chamber 40b. In this way, the solids-bearing saturant can be pushed farther into the substrate, away from the first side, as described above. Preferably, the pressures developed by the pumps 50a, 50b can be independently adjusted in order to provide maximum operational flexibility.

Simply by way of example, each of the saturating chambers 40a, 40b can have a length in the machine direction of 30 millimeters, and the mandrel 32 can have a diameter of 20 centimeters. The rotational speed of the mandrel 32 can be adjusted to obtain any desired dwell time of the substrate 12 within the saturating chambers, as for example in the range of 0.5 to 2 seconds. By way of example, the seal chambers 42a, 42b can also have a length in the machine direction of 30 millimeters. Of course, all of these dimensions are merely illustrative, and the pressure saturator 30 can be made in much larger sizes to operate at much greater speeds if desired for appropriate applications.

As pointed out above, the first and second applicators 18, 22 may operate to push the saturant and displacement material into the substrate. It has been found that a pressure saturator of the type described in U.S. Pat. No. 4,588,616 is particularly well suited for this application. Such saturators include a converging saturating chamber, such that the motion of the substrate through the chamber generates pressures tending to force the saturant or displacement material into the substrate.

Figure 3:
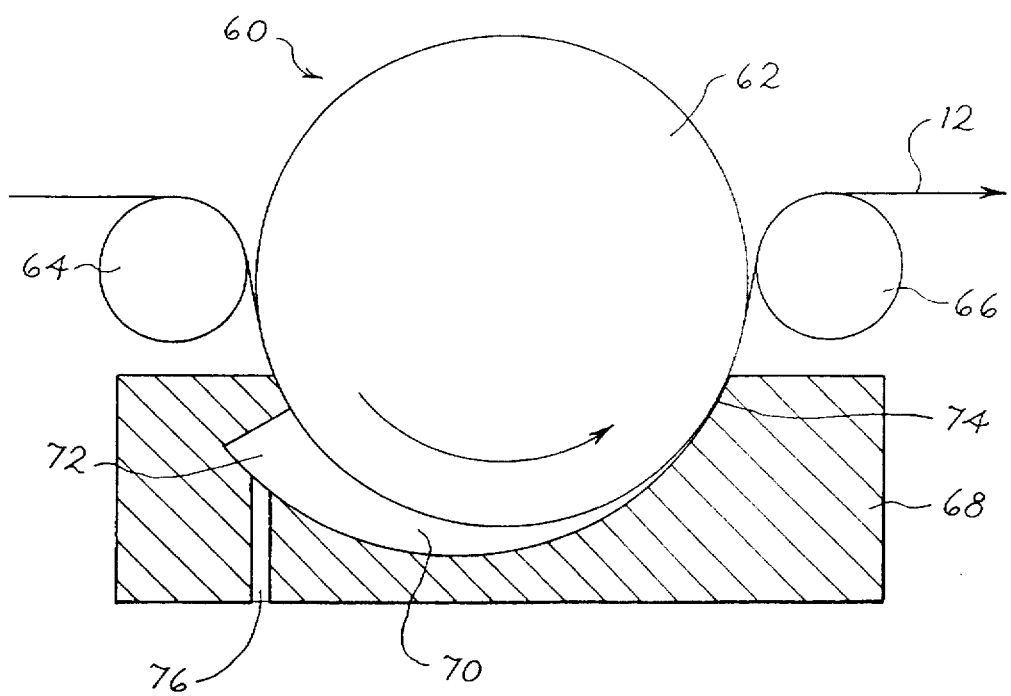
FIG. 3 is a cross-sectional view of another pressure saturator suitable for use in the method of FIG. 1.

FIG. 3 shows a pressure saturator 60 of this general type. The saturator 60 can be used for the first and/or second applicator 18, 22 of FIG. 1. The pressure saturator 60 includes a mandrel 62 and feed rolls 64, 66. A chamber-defining element 68 defines a saturating chamber 70 which has a relatively deep entrance region 72 and a relatively shallow exit region 74. The chamber 70 converges in depth from the entrance region 72 to the exit region 74. An inlet 76 supplies the saturant or displacement material to the converging chamber 70.

Converging chamber pressure saturators are well known in the art, and therefore do not need to be described in detail here. See for example the discussions in U.S. Pat. Nos. 4,588,616, 4,702,943, 4,915,989 and 4,982,686, assigned to the assignee of the present invention. Suitable pressure saturators of the type shown in FIG. 3 can be obtained from Vits Maschinenbau GmbH, Langenfeld, Germany. These saturators provide excellent saturation, and have particular advantages when operated at high web speeds.

Figure 9:
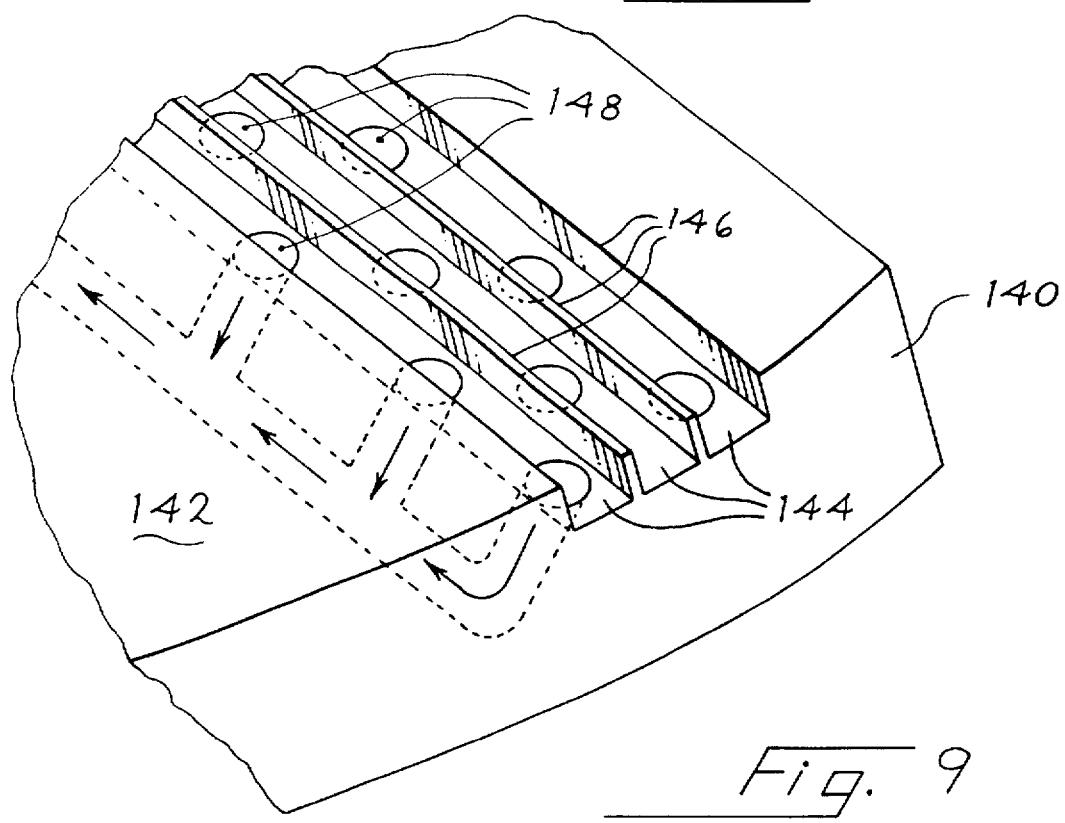
FIG. 9 is a perspective view of a labyrinth seal suitable for use in the pressure saturators of FIGS. 2 through 5.

Preferably, such saturators include a deckle seal, which is a plastic band which may be raised in part or in whole by a series of pistons positioned behind it. This seal limits fluid loss at the edges of the substrate. In addition, such saturators preferably include a labyrinth seal such as that shown in FIG. 9. In FIG. 9, a chamber-defining element 140 is shown which defines a saturating chamber in the region 142. Three parallel grooves 144 are placed near the exit of the saturating chamber. Each groove is about 1.5 cm in width (measured parallel to the machine direction) and extends across the full length of the element 140. Each of the grooves 144 is approximately 1.0 cm in depth, and each is provided with a series of drainage openings 148 spaced approximately 5 cm apart and approximately 1.3 cm in diameter. The drainage openings are connected to a system for recycling saturant or displacement material. The uppermost edges 146 of the walls adjacent the grooves 144 form sealing surfaces, and are positioned closely adjacent to the substrate being passed through the saturator.

Figure 4:
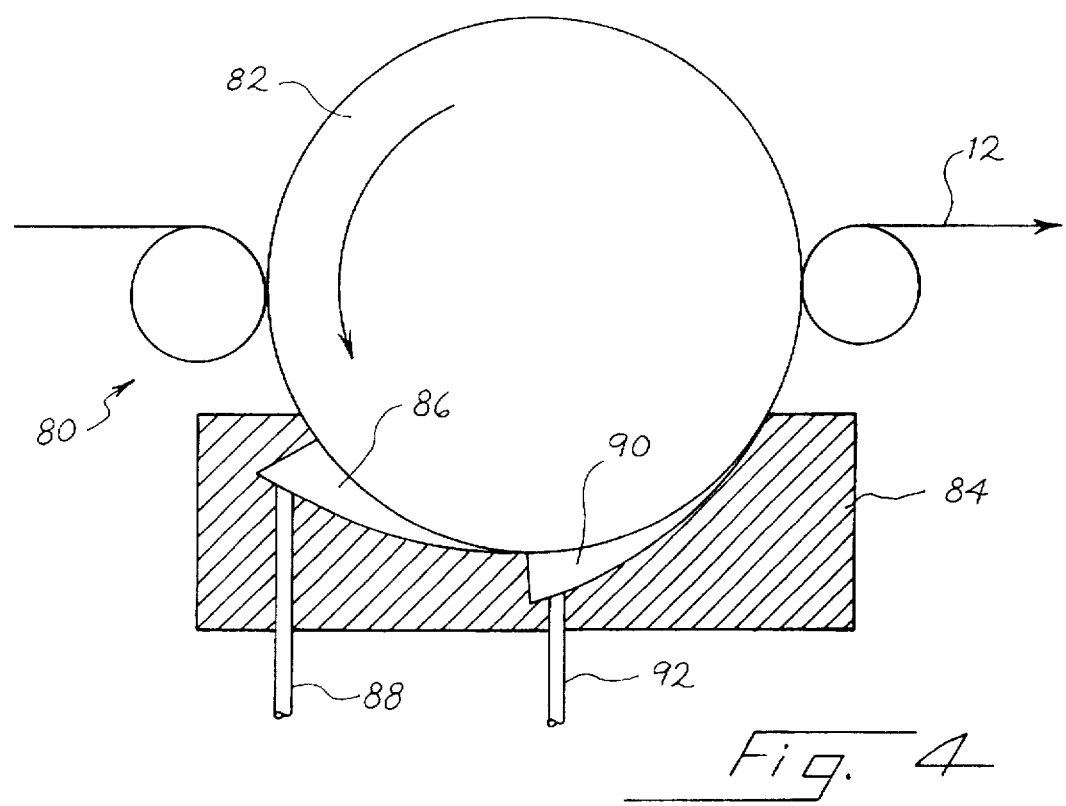
FIGS. 4 and 5 are cross-sectional views of two additional pressure saturators suitable for use in the system of FIG. 1.

FIG. 4 shows another type of converging chamber pressure saturator 80 which can be used for the both the first and second applicators 18, 22 of FIG. 1. The pressure saturator 80 includes a mandrel 82 and a pressurizing chamber-defining element 84. In this case, the element 84 defines first and second converging pressurizing chambers 86, 90. Both of these converging chambers 86, 90 are generally constructed as described above in conjunction with FIG. 3. The first chamber 86 includes a first inlet 88 adapted to receive the saturant described above, and the second chamber 90 includes a second inlet 92 adapted to receive the displacement material described above.

Figure 5:
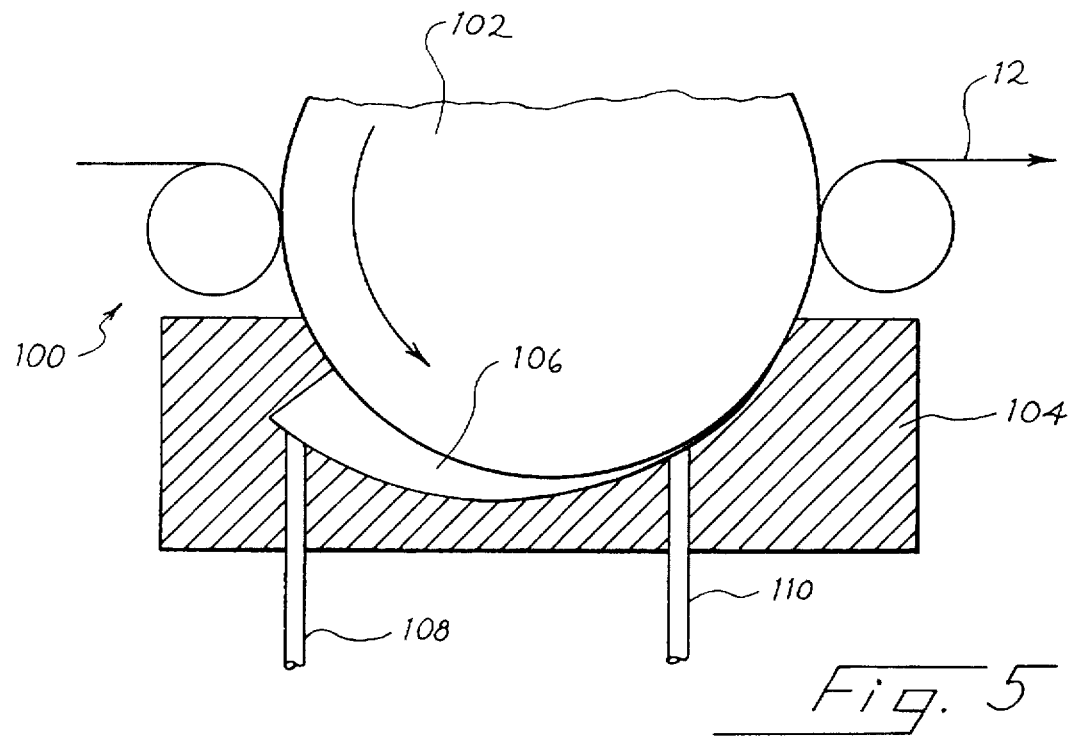

FIG. 5 shows another converging chamber pressure saturator 100 suitable for use in the system 10. In the saturator 100 a mandrel 102 is mounted for rotation adjacent to a chamber-defining element 104 which defines a single converging chamber 106 of the type described above. The single chamber 106 includes a first inlet 108 for the saturant and a second inlet 110 for the displacement material described above. The first inlet 108 is positioned nearer to the entrance region of the chamber 106, and the second inlet 110 is positioned nearer to the exit region of the chamber 106. In the saturator 100 the solids-bearing saturant is introduced into the substrate 12 before the displacement material. One limitation of this approach may be that the solids-bearing saturant is mixed with the displacement material, and recycling of saturant that has leaked out of the saturating chamber is therefore somewhat more difficult.

Figure 6:
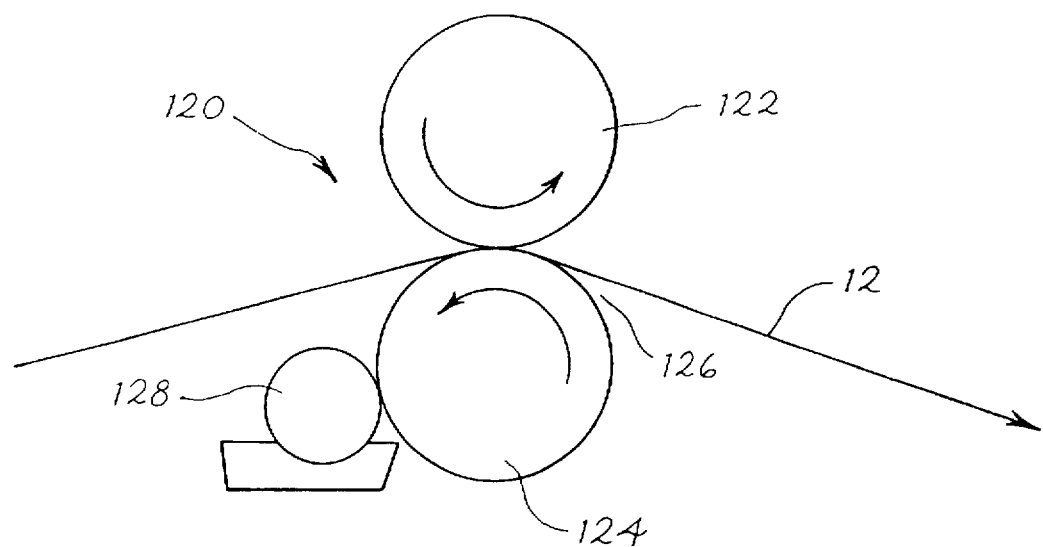
FIG. 6 is a cross-sectional view of a roller coater suitable for use in the system of FIG. 1.

FIG. 6 shows a reverse roller coater 120 that can be used for either the first or second applicator 18, 22 of FIG. 1. The roller coater 120 includes two opposed rollers 122, 124 which are mounted for rotation adjacent to one another, with the substrate 12 passing therebetween. A suitable saturant or displacement material is applied by an applicator roller 128 to the roller 124, which introduces it into a first side of the substrate 12 in the region 126 opposing one of the rollers 122. Such roller coaters are well known in the art and do not require further elaboration here.

Figure 7:
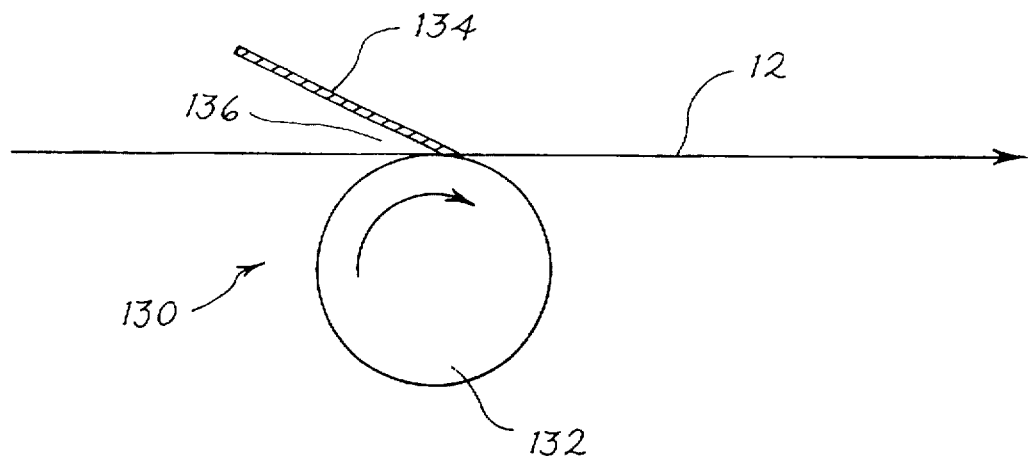
FIG. 7 is a cross-sectional view of a blade coater suitable for use in the system of FIG. 1.

FIG. 7 shows a cross-sectional view of a blade coater 130 that can be used for either of the applicators 18, 22 of FIG. 1. The blade coater 130 includes a roller 132 mounted for rotation opposite of blade 134, with the substrate 12 passing therebetween. Saturant or displacement material is introduced into a first side of the substrate 12 in the region 136 between the blade 134 and the substrate 12. Blade coaters are also well known in the art, and therefore do not need to be described here.

Several examples of suitable saturant and displacement material are shown in Table 1.

TABLE 1

|  | SATURANT | DISPLACEMENT MATERIAL |
|---|---|---|
| Ex. 1 | 65 wt % water<br>35 wt % lignin/starch | 100 wt % water |
| Ex. 2 | 65 wt % water<br>35 wt % lignin/starch | 95 wt % water<br>5 wt % lingnin/starch |
| Ex. 3 | 65 wt % water<br>35 wt % sodium silicate | 99.5 wt % water<br>.5 wt % sodium bicarbonate |
| Ex. 4 | ⅔ crushed limestone<br>⅓ asphalt | 100 wt % asphalt |

Figure 8:
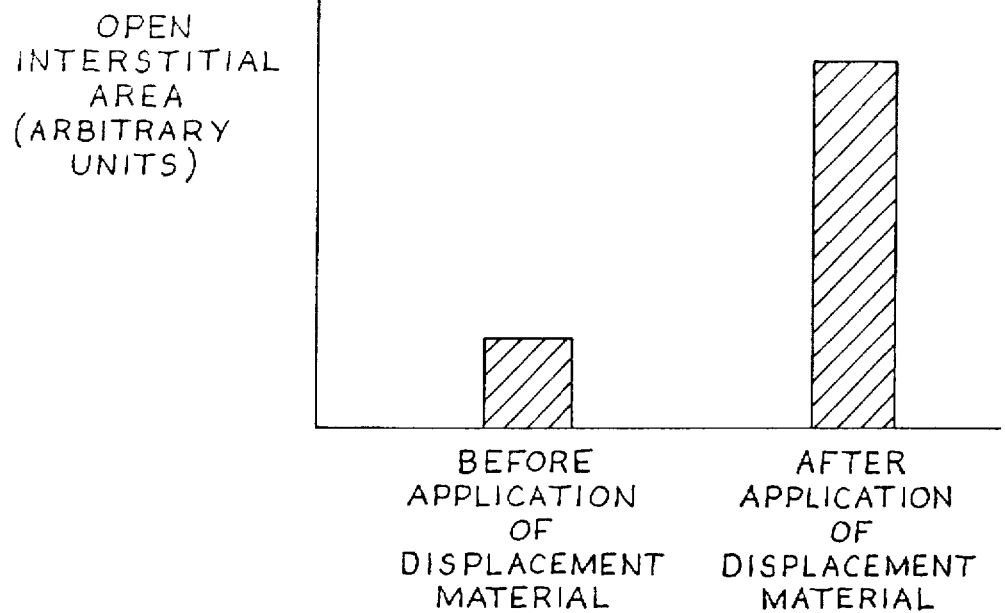
FIG. 8 is a graph used to illustrate one mode of operation of the system of FIG. 1.

In Example 1, the saturant is a solution of lignin, starch and water, with a solids concentration of 35% by weight. Suitable lignin can be obtained from LignoTech of Vargon, Sweden under the tradename Weltex 300. Suitable starch can be obtained from A. E. Staley of Decatur, Ill. In some applications it may be desirable to displace the lignin and starch from the first surface with a displacement material that consists essentially of water. FIG. 8 shows the ratio of open interstitial area at the first surface to the total area of the first surface after the saturant of Example 1 has been applied by the first applicator 18, and after the displacement material of Example 1 has been applied by the second applicator 22. Note that the open interstitial area is substantially greater after the displacement material has been introduced.

In Example 2 of Table 1, the saturant and the displacement material have the same carrier liquid (water) and the same additive (lignin-starch). However, in this case the additive is present in a substantially higher concentration in the saturant than in the displacement material.

Example 3 relates to another system, which uses a sodium silicate saturant and a displacement material which includes a solution of water and a bonding enhancement additive such as sodium bicarbonate to reduce the pH of the surface. Sodium silicate is available from the PQ Corporation, Valley Forge, Pa., and is identified as PQ product N. With this approach the bonding enhancement additive is not mixed with the sodium silicate solids. This may reduce costs, because the bonding enhancement additive is localized nearer the first surface rather than being distributed throughout the substrate. In some cases, for example, the bonding enhancement additive may be most beneficial when found at the first surface and within three to five layers of fibres of the first surface. The bonding enhancement additive may be used at greater or lesser concentrations than the lignin or other additive in the saturant.

In Example 4, the saturant is a mixture of asphalt and limestone dust that is heated and then impregnated into a substrate to form a roofing shingle. The asphalt/limestone mixture is less expensive than asphalt alone, but asphalt without limestone makes a superior surface for the shingle. In this case heated asphalt is used as the displacement material to force the asphalt/limestone mixture into the substrate. In this way the surface of the shingle is impregnated with asphalt. In this example the stabilizer cools the impregnated substrate rather than drying it as in the previous examples. As before, the stabilizer is positioned downstream of the second applicator.

As another example, the system 10 can be used to resize the surface and near-surface fibers of the substrate. Proper sizing causes water to be held at the surface, which assists in the gelatinization of starch (often used as an adhesive). When a substrate is impregnated with lignin, for example, there is an excessive drawing of the water away from the surface. Pushing the lignin into the paperboard as described above is beneficial for some applications, but the process may reduce the concentration of sizing at the surface which was originally incorporated in the paper at the paper mill. In order to overcome this problem, sizing additives can be used in the displacement material and sizing material can be applied in the same step as the lignin is pushed away from the first surface by the displacement material.

When water or some other passive material is used as the displacement material to push the saturant solids into the substrate, it is anticipated that later drying will remove the water and leave the surface and near-surface areas with substantially reduced solids.

As another example, the system 10 can be used to impregnate a lignin-starch saturant into recycled liner board. Lignin and starch are inexpensive, recyclable, high strength building chemicals that have FDA approval for use in food contact. These characteristics make lignin and starch very attractive for building greater strength in paperboard, particularly paperboard made from recycled fibre. Lignin and starch, however, are viscous, and they resist deep penetration into denser paperboards used in making, for example, corrugated containers (liner board and corrugating medium). As an example, one appropriate level of treatment is to introduce a 35% solids lignin-starch mixture from one surface which penetrates the paperboard approximately 50% of the surface-to-surface direction. Such a treatment can add approximately 3 lbs. of dry lignin-starch for each 1,000 square feet (MSF) of liner board. The system 10 can then be used to impregnate 1.5 lbs. of water per MSF. This is expected to redistribute the lignin-starch in a region beginning at 25% and extending to 75% through the surface-to-surface direction. Later, drying of the impregnated substrate will remove the water (both from the saturant and the displacement material), and such drying is expected to redistribute the lignin-starch to a region beginning at about 10 k and extending to about 90 k of the surface-to-surface direction. In the example discussed above, the saturant is effectively reduced from a 35% solids saturant to a 30% solids saturant for drying requirements. This 30% solids level is far higher than the 5 to 10% solids level sometimes suggested when saturants are diluted to reduce adverse surface effects.

From the foregoing, it should be apparent that an improved method and apparatus have been described which push a previously impregnated saturant farther into a porous substrate. This system can be used to leave a controlled area at and near the surface of a previously impregnated substrate relatively free of saturant solids and to leave the surface pores and at least some of the interstices near the surface open and relatively unrestricted by previously-impregnated saturant solids. The displacement material can either be a passive liquid such as water, it can include additives chosen for surface treatment, or it can consist of materials chosen for near surface treatment.

Of course, it should be understood that a wide range of changes and modifications can be made to the preferred embodiments described above. It is therefore intended that the foregoing examples be regarded as an illustration of the presently preferred forms of the invention, and not as a limitation on the scope of the invention. It is only the following claims, including all equivalents, which are intended to define the scope of this invention.

I claim:

1. A method for impregnating a porous substrate with a solids-bearing saturant, said method comprising the following steps:

(a) introducing the saturant into the substrate from a first side; and then (b) introducing a displacement material into the substrate from the first side, using an apparatus that forces said displacement material into the substrate from the first side to cause said displacement material to force at least some of the saturant in the substrate farther into the substrate, away from the first side.

2. The method of claim 1 wherein said displacement material has a more reduced solids content as compared to the saturant such that the substrate has a reduced solids concentration at the first side after the second introducing step than after the first introducing step.

3. The method of claim 1 wherein the first introducing step comprises the step of passing the substrate through a first saturating chamber containing the saturant.

4. The method of claim 1 or 3 wherein the second introducing step comprises the step of passing the substrate though a second saturating chamber containing the displacement material.

5. The method of claim 1 wherein the first introducing step comprises the step of passing the substrate through a first saturating chamber, said first saturating chamber containing the saturant and converging from a greater depth near an entrance region to a lesser depth near an exit region of the first saturating chamber.

6. The method of claims 1 or 5 wherein the second introducing step comprises the step of passing the substrate through a second saturating chamber, said second saturating chamber containing the displacement material and converging from a greater depth near an entrance region to a lesser depth near an exit region of the second saturating chamber.

7. The method of claim 1 wherein the first and second introducing steps are performed in a single saturating chamber.

8. The method of claim 1 wherein no additional process steps are performed between steps (a) and (b).

9. The method of claim 1 wherein the second introducing step is performed prior to any substantial drying of the saturant on the first side of the substrate.

10. The method of claim 1 further comprising the step of stabilizing the saturant in the substrate after the second introducing step.

11. The method of claim 1 wherein after the second introducing step the first side of the substrate is substantially free of those saturant solids introduced during the first introducing step.

12. The method of claim 1 wherein the first side comprises interstices having an interstitial area per unit area, and wherein the interstitial area per unit area that is open and substantially unrestricted by previously impregnated saturant solids is greater after the second introducing step than after the first introducing step.

13. The method of claim 1 wherein some of the saturant is situated at the first side at the start of step (b).

14. The method of claim 1 wherein saturant level at the first side remains substantially unchanged between completion of step (a) and initiation of step (b).

15. The method of claim 1 wherein the substrate passes from step (a) to step (b) without displacing the saturant in the substrate between steps (a) and (b).

16. A method for impregnating a porous substrate with a solids-bearing saturant, said method comprising the following steps:

(a) introducing the saturant into the substrate from a first side; and then (b) pushing the saturant farther into the porous substrate with a flowable displacement material introduced into the first side of the substrate.

17. The method of claim 16 wherein said displacement material has a more reduced solids content as compared to the saturant such that the substrate has a reduced solids concentration at the first side after the pushing step than after the introducing step.

18. The method claim 16 wherein, after the pushing step, the first side of the substrate is substantially free of those saturant solids introduced during the introducing step.

19. The method of claim 16 wherein the first side comprises an interstitial area per unit area, and the interstitial area per unit area that is open and substantially unrestricted by previously impregnated saturant solids is greater after the pushing step than after the introducing step.

20. The method of claim 16 wherein some of the saturant is situated at the first side at the start of step (b).

21. The method of claim 16 wherein saturant level at the first side remains substantially unchanged between completion of step (a) and initiation of step (b).

22. The method of claim 16 wherein the substrate passes from step (a) to step (b) without displacing the saturant in the substrate between steps (a) and (b).

23. The method of claim 1 or 16 wherein the displacement material consists essentially of water.

24. The method of claim 1 or 16 wherein the saturant and the displacement material both comprise a carrier liquid and an additive, and wherein the additive is present in a greater concentration in the saturant than in the displacement material.

25. The method of claim 1 or 16 wherein the saturant comprises a carrier and an additive, and wherein the displacement material comprises the carrier.

26. The method of claim 1 or 16 wherein the displacement material consists essentially of a liquid.

27. The method of claim 1 or 16 wherein the displacement material has a different effect on the first side than does the saturant.

* * * * *